United States Patent
Prashar

(10) Patent No.: US 12,410,334 B2
(45) Date of Patent: Sep. 9, 2025

(54) INKJET INKS FOR MINIMIZING GHOSTING ARTEFACTS

(71) Applicant: Memjet Technology Limited, Dublin (IE)

(72) Inventor: Jognandan Prashar, North Ryde (AU)

(73) Assignee: Memjet Technology Limited, Dublin (IE)

(*) Notice: Subject to any disclaimer, the term of this patent is extended or adjusted under 35 U.S.C. 154(b) by 870 days.

(21) Appl. No.: 17/680,075

(22) Filed: Feb. 24, 2022

(65) Prior Publication Data

US 2022/0282103 A1    Sep. 8, 2022

Related U.S. Application Data

(60) Provisional application No. 63/156,546, filed on Mar. 4, 2021.

(51) Int. Cl.
| | | |
|---|---|---|
| C09D 11/38 | (2014.01) | |
| B41J 2/135 | (2006.01) | |
| C08G 65/08 | (2006.01) | |
| C08G 77/46 | (2006.01) | |
| C08K 5/17 | (2006.01) | |
| C08L 25/14 | (2006.01) | |
| C09D 11/033 | (2014.01) | |
| C09D 11/102 | (2014.01) | |
| C09D 11/107 | (2014.01) | |
| C09D 11/322 | (2014.01) | |

(52) U.S. Cl.
CPC ........... C09D 11/38 (2013.01); B41J 2/135 (2013.01); C08G 65/08 (2013.01); C08G 77/46 (2013.01); C08K 5/175 (2013.01); C08L 25/14 (2013.01); C09D 11/033 (2013.01); C09D 11/102 (2013.01); C09D 11/107 (2013.01); C09D 11/322 (2013.01)

(58) Field of Classification Search
CPC ...... C09D 11/106; C09D 11/107; C09D 11/38
See application file for complete search history.

(56) References Cited

U.S. PATENT DOCUMENTS

| | | | | |
|---|---|---|---|---|
| 7,246,886 | B2 * | 7/2007 | Silverbrook | B41J 2/1603 |
| | | | | 347/56 |
| 8,622,534 | B2 * | 1/2014 | Bisson | B41J 2/04513 |
| | | | | 347/100 |
| 9,834,694 | B2 * | 12/2017 | Fukuda | C09D 11/38 |
| 9,994,017 | B2 * | 6/2018 | North | B41J 2/14016 |
| 2020/0062982 | A1 * | 2/2020 | Prashar | C09D 11/38 |

FOREIGN PATENT DOCUMENTS

| | | | | |
|---|---|---|---|---|
| JP | H1024565 | A * | 1/1998 | |
| JP | 5999306 | B2 * | 9/2016 | C09D 11/38 |

* cited by examiner

*Primary Examiner* — Sophie Hon
(74) *Attorney, Agent, or Firm* — Garson & Gutierrez, PC

(57) ABSTRACT

An inkjet ink includes: an ink vehicle; a polymer; a surfactant package containing an ethoxylated acetylenic nonionic surfactant having an HLB value in the range of 5 to 10; and an ABA-type bis-alkoxylated silicone compound. The ink has a surface tension in the range of 26 to 31 mN/m.

11 Claims, No Drawings

INKJET INKS FOR MINIMIZING GHOSTING ARTEFACTS

CROSS REFERENCE TO RELATED APPLICATIONS

This application claims priority to and the benefit of U.S. Provisional Patent Application No. 63/156,546, entitled INKJET INKS FOR MINIMIZING GHOSTING ARTEFACTS, filed on Mar. 4, 2021, the disclosure of which is incorporated herein by reference in its entirety for all purposes.

FIELD OF THE INVENTION

This invention relates to an inkjet ink. It has been developed primarily for minimizing kogation in thermal inkjet printheads, especially kogation resulting in reduced image intensity during an initial burn-in period of a new printhead.

BACKGROUND OF THE INVENTION

The present Applicant has developed a plethora of high-speed inkjet printers employing stationary Memjet® printheads which extend across a media width. By contrast, most other types of inkjet printer utilize a scanning printhead which traverses across the media width.

High-speed pagewide printing necessarily places additional demands on the design of the printhead compared to traditional types of inkjet printhead. The nozzle devices must have a self-cooling design, high ink refill rates and high thermal efficiency. To this end, the Applicant has developed a range of thermal bubble-forming printheads, including those with suspended resistive heater elements (as described in, for example, U.S. Pat. Nos. 6,755,509; 7,246,886; 7,401,910; and 7,658,977, the contents of which are incorporated herein by reference) and those with embedded ("bonded") resistive heater elements (as described in, for example, U.S. Pat. Nos. 7,377,623; 7,431,431; 9,950,527; 9,283,756 and 9,994,017, the contents of which are incorporated herein by reference).

Inkjet inks require a balance of properties to control a number of different performance characteristics, such as printhead lifetime, nozzle dehydration, nozzle refill rates, dry times, print quality and print durability. Over the past 30 years or so, ink formulation chemists have developed an armory of formulation 'levers' for adjusting ink performance. For example, changes in pigment dispersions, co-solvents, surfactants and other ink additives may be used to control ink performance. However, it is often the case that attempts to improve one performance characteristic, via a change of ink formulation, have a deleterious effect on another performance characteristic. The goal of ink formulation is, therefore, to provide an ink having an acceptable balance of properties for a given use case.

Thermal inkjet nozzle devices are especially demanding on ink properties. The harsh environment inside a MEMS nozzle chamber generating very high temperatures and pressures places increased demands on inks. For pigment-based inks containing polymer dispersants, the interaction between inks and resistive heater elements typically causes kogation—a term describing the deposition of pigment and/or polymer particles on the heater element. The extent of kogation, as well as the consequent changes in print quality, is influenced both by the ink formulation and the surface characteristics of the heater element. Kogation typically results in less energy being transferred to the ink, resulting in reduced droplet ejection velocities (sometimes known in the art as 'decel') and/or smaller droplet volumes which typically manifest in a lower image intensity (as measured by L* values) in printed images.

Kogation may be permanent—building up gradually over the lifetime of the printhead; transient—temporarily depositing on the heater element during printing and then resetting between print jobs; or semi-permanent—depositing and re-dispersing over an initial 'burn-in' period of the printhead until all inkjet nozzles in the printhead have relatively stable droplet ejection characteristics. Typically, all three types of kogation interplay and affect, to some extent, the performance of the printhead for any given print job.

As used herein, the term 'ghosting' or 'ghosting artefact' is used to describe semi-permanent kogation of the type that exhibits lower L* values over an initial burn-in period of a printhead (typically 1 to 50 million ejections). The extent of so-called ghosting artefacts in a printed image depends on nozzle usage in new printheads. If only one set of nozzles is used during an initial period (e.g. when printing solid vertical bars), then that set of nozzles will tend to have relatively more kogation than unused nozzles. Accordingly, when a contone image is printed subsequently using all nozzles of the printhead, the initially used set of nozzles having relatively more kogation will exhibit lower L* values (by virtue of lower droplet volumes) in the printed contone image than the initially unused nozzles. This manifests in a 'ghosting' artefact whereby the 'ghost' of initially used nozzles is visible in the printed contone image in the form of lower L* values (i.e. lower image intensity). Curiously, this trend reverses over time, whereby the initially used set of nozzles recover to some extent (presumably via redispersion of at least some of the semi-permanent kogate) and the initially unused nozzles go through their burn-in period. After several million ejections (e.g. 1 to 50 million ejections), all nozzles in the printhead usually reach a stable state, having relatively consistent droplet volumes and L* values. All nozzles in the printhead will then typically perform consistently over their lifetime of several billion droplet ejections.

As mentioned above, as well as ink characteristics, kogation may also be affected by the surface characteristics of a heater element. For example, microscopic surface contaminants on the heater surface may act as a seed for kogative deposition. U.S. application Ser. No. 16/889,734 filed 1 Jun. 2020, the contents of which are incorporated herein by reference, describes a wafer handling process which minimizes contamination of MEMS structures from microscopic inorganic contaminants.

While improvements in wafer handling processes can assist in mitigating so-called 'ghosting' artefacts, there is still a need to minimize such artefacts through improvements in ink formulations.

Prior art approaches to minimizing kogation in thermal inkjet printhead generally focus on the use of phosphates and related salts, which are believed to assist in repulsion of kogating species on the heater surface. For example, U.S. Pat. Nos. 8,770,736, 6,592,657 and 6,533,851 (assigned to Hewlett-Packard Company) describe the use of phosphate ester surfactants, phosphonic acids and phosphonate salts for reducing kogation. Similarly, U.S. Pat. No. 6,902,264 (assigned to Canon Kabushiki Kaisha) describes the use of polyphosphoric acids for reducing kogation. However, phosphate-type additives are disadvantageous in terms of destabilizing polymer dispersions. Destabilization of the dispersion typically results in flocculation of pigments and long-term storage problems.

U.S. Pat. No. 5,169,437 (assigned to Hewlett-Packard Company) describes the use of ethoxylated glyercol humectants for reducing kogation in thermal inkjet printheads.

While certain prior art additives may be effective for reducing permanent kogation in some thermal inkjet printheads, such additives have not been found to be particularly effective in reducing the type of kogation causing so-called "ghosting" artefacts, as described above.

It would therefore be desirable to provide an ink, which minimizes print artefacts caused by semi-permanent and/or transient kogation during an initial "burn-in" period of a printhead. It would further be desirable that such inks contain ingredients which do not disturb the overall balance of ink properties.

SUMMARY OF THE INVENTION

In a first aspect, there is provided an inkjet ink comprising:
an ink vehicle;
a polymer;
a surfactant package comprising an ethoxylated acetylenic nonionic surfactant having an HLB value in the range of 5 to 10; and
an ABA-type bis-alkoxylated silicone compound of formula (I):

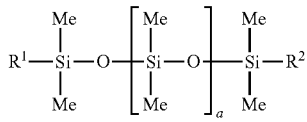

(I)

wherein:
a is 1, 2, 3, 4 or 5;
$R^1$ and $R^2$ are each independently a moiety of formula (II):

$$-(CH_2)_pO-(C_2H_4O)_q-(C_3H_6O)_rH \quad (II)$$

p is 1, 2, 3, 4 or 5;
q is 0 to 200;
r is 0 to 200;
q+r is greater than 1; and
a surface tension of the ink is in the range of 26 to 31 mN/m.

Inks according to the first aspect advantageously improve 'ghosting' performance in thermal inkjet printheads, presumably by ameliorating semi-permanent and/or transient kogation on heaters during an initial burn-in period of the printhead, as will be explained in more detail below.

Preferably, p is 3; q≠0; r≠0. For example, q may be 1 to 100 and r may be 1 to 100. For example, the ABA-type bis-alkoxylated silicone compound may be of formula (IV):

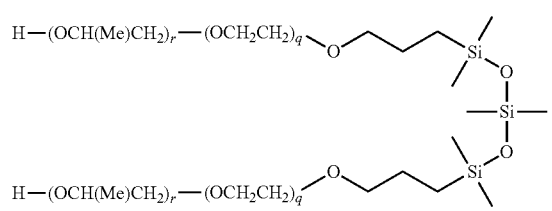

(IV)

A specific example of a commercially available ABA-type bis-alkoxylated silicone compound according to formula (IV) is Dow Corning Additive 8526.

Preferably, the compound of formula (I) has a molecular weight in the range of 4000 to 10,000 g/mol, or preferably 6000 to 8000 g/mol.

Preferably, the ABA-type bis-alkoxylated silicone compound is present in an amount ranging from 0.1 to 1 wt. %. Advantageously, ABA-type bis-alkoxylated silicone compound of formula (I) have relatively low surfactancy and can be added in sufficient quantities to assist in reducing kogation (as well as improving durability of printed inks) with minimal impact on the surface tension of the ink.

The surface tension range is suitable for rapid nozzle chamber refilling during high frequency printing (e.g. 15 kHz printing or greater). Therefore, the surfactants present in the ink and their quantities need to be carefully selected and controlled. Preferably, the surface tension of the ink is in the range of 27 to 30 mN/m.

Preferably, the ink contains less than 0.1 wt. % of a rake-type mono-alkoxylated silicone compound of formula (III):

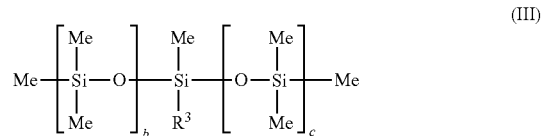

(III)

wherein:
b and c are each independently 1, 2, 3, 4 or 5;
$R^3$ is each independently a moiety of formula (II) as defined above.

Rake-type silicones of formula (III) have a high degree of surfactancy and cannot, therefore, be used in quantities greater than about 0.1 wt. % whilst meeting the requisite ink surface tension range of 26 to 31 mN/m.

In some embodiments, the ink comprises a zwitterionic compound, such as an amino acid. Preferably, the zwitterionic compound is glycine. Zwitterionic compounds are believed to assist in repulsion of the charged kogating polymer species (e.g. styrene-acrylic) polymers via a double-layer effect at the heater surface. Preferably, the zwitterionic compounds is present in an amount in the range of 0.05 to 1 wt. %, more preferably 0.05 to 0.5 wt. %.

In some embodiments, the surfactant package comprises an anionic surfactant, which is also believed to assist in repulsion of the kogating polymer species. A preferred example of a suitable anionic surfactant are sulfonate surfactants (e.g. di($C_{6-30}$ alkyl) sulfosuccinate sodium salt) as described in US2020/0062982, the contents of which are herein incorporated by reference. Other types of anionic surfactant are described hereinbelow. Preferably, the anionic surfactant is present in an amount in the range of 0.05 to 1 wt. %, more preferably 0.05 to 0.5 wt. %.

The polymer may be an ionic polymer (e.g. anionically charged polymer), such as a styrene-acrylic polymer suitable for dispersing a pigment.

Typically, the ink contains a pigment, which is dispersed by the polymer. However, in some embodiments, the ink may be, for example, a binder fluid containing the polymer but absent any colorant, such as a pigment.

The ethoxylated acetylenic nonionic surfactant is included in the ink to provide excellent ghosting performance in combination with the alkoxylated silicone compound of formula (I). Preferably, the ethoxylated acetylenic nonionic surfactant is present in an amount in the range of 0.2 to 1.5 wt. %, more preferably 0.4 to 1.2 wt. %. Preferably, a total amount of the ethoxylated acetylenic nonionic surfactant and the alkoxylated silicone compound of formula (I) is at least 0.8 wt. %, at least 1 wt. %, or preferably in the range of 0.8 to 1.5 wt. %.

Preferably, the ethoxylated acetylenic nonionic surfactant has an HLB value in the range of 7 to 9.

Surprisingly, non-ethoxylated nonionic surfactants, such as the thioether surfactants described in US2020/0062982 have relatively poor ghosting performance even when used in combination with the alkoxylated silicone compound of formula (I).

Preferably, the surfactant package further comprises a poly(oxyethylene) alkyl ether surfactant. The poly(oxyethylene) alkyl ether assists in stabilizing the ethoxylated acetylenic surfactant in the ink and minimizes potential phase separation that may be caused through the use of a relatively high HLB surfactant. Preferably, the poly(oxyethylene) alkyl ether surfactant is present in an amount in the range of 0.05 to 0.5 wt. %.

In a preferred embodiment, the ink comprises: an ABA-type bis-alkoxylated silicone according to formula (I), an ethoxylated acetylenic nonionic surfactant having an HLB value in the range of 5 to 10, a poly(oxyethylene) alkyl ether surfactant and at least one of: a zwitterionic compound and an anionic surfactant. In one preferred embodiment, the ink contains both the zwitterionic compound and the anionic surfactant.

Preferably, the ink vehicle comprises water and one or more co-solvents.

Preferably, the ink comprises one or more co-solvents selected from the group consisting of: glycol ethers, triethylene glycol and glycerol Typically, the ink has a pH of greater than 7, greater than 8 or greater than 9.

In a second aspect, there is provided a method of minimizing kogation of a resistive heater element in an inkjet nozzle device, the method comprising:
supplying the inkjet ink as described above to the inkjet nozzle device; and
actuating the heater element,
wherein the surfactant package and the compound of formula (I) together minimize kogation of polymer on the metal oxide surface.

Typically, the heater element has a metal oxide surface in contact with the ink.

In a third aspect, there is provided a printer comprising:
a printhead having a plurality of inkjet nozzle devices; and
an ink reservoir in fluid communication with the printhead, said ink reservoir containing an ink as described above.

Typically, each inkjet nozzle device comprises a resistive heater element having a metal oxide surface.

The term "alkyl" is used herein to refer to alkyl groups in both straight and branched forms, typically having from 1 to 30 carbon atoms. Unless stated otherwise, the alkyl group may also be interrupted with 1, 2 or 3 double and/or triple bonds. However, the term "alkyl" usually refers to alkyl groups having no double or triple bond interruptions. The term "alkyl" usually refers to acyclic alkyl groups, but it may also include cycloalkyl groups.

Where reference is made to bis-alkoxylated silicone compounds herein, this usually refers to bis-$C_{2-3}$alkoxylated silicone compounds.

As used herein, the term "ink" is taken to mean any printing fluid, which may be printed from an inkjet printhead. The ink may or may not contain a colorant. Accordingly, the term "ink" may include conventional dye-based or pigment-based inks, infrared inks, fixatives (e.g. pre-coats and finishers), 3D printing fluids (e.g. binder fluids which may contain the polymer), functional fluids (e.g. solar inks, sensing inks etc), biological fluids, and the like. Where reference is made to fluids or printing fluids, this is not intended to limit the meaning of "ink" herein.

DETAILED DESCRIPTION OF THE INVENTION

The present inventors sought a solution to the problem of minimized ghosting artefacts during an initial burn-in period of inkjet printheads. As discussed above, transient and semi-permanent kogation on heater elements was believed to be responsible for such ghosting artefacts and the present inventors turned their attention to anti-kogation additives to address this problem. Ethoxylated glycerols, such as Liponic® EG-1, have been used previously by the present Applicant to reduce kogation in dye-based inks (see, for example, WO2016/078859). However, ethoxylated glycerols have found only limited success in reducing kogation in the Applicant's pigment-based inks and it was therefore necessary to identify alternative anti-kogation additives. ABA-type bis-alkoxylated silicone compounds (e.g. Dow Corning Additive 8526) are useful ingredients in inkjet inks due to their ability to improve the durability of printed inks, particularly on glossy media. Such silicones are attractive ink additives due to their low surfactancy, meaning that they can be added in effective quantities without disturbing the overall balance of ink properties. The present inventors hypothesized that such silicones could be useful in reducing kogation by increasing the lubricity of the heater surface, thereby minimizing the extent to which polymers can be adsorbed onto the heater surface. However, the combination of an ABA-type bis-alkoxylated silicone compound with a non-ethoxylated surfactant provided relatively poor results in terms of ghosting.

Having screened a multitude of different ink additives in different combinations, it was found, surprisingly that switching to an ethoxylated acetylenic surfactant provided a moderate improvement in ghosting performance. Moreover, the combination of an ABA-type bis-alkoxylated silicone compound with an ethoxylated acetylenic nonionic surfactant having an HLB value of in the range of 5-10 provided a significant improvement in ghosting performance. It appeared that a sufficient amount of ethoxylated species in the ink was necessary to reduce transient and/or semi-permanent kogation at the heater surface. However, use of high HLB surfactants (i.e. HLB>10) were less effective and caused some phase separation of the inks.

For some inks, this improvement was enhanced even further with the addition of glycine and/or an anionic surfactant. Without wishing to be bound by theory, the zwitterionic amino acid is believed to be involved in the formation of an electric double layer at the heater surface, which may further assist in repulsion of polymer dispersants. Anionic surfactants are believed to be similarly involved in repelling polymer dispersants at the heater surface.

Colorant

The inks utilized in the present invention are typically dye-based or pigment-based inks, preferably pigment-based.

Inkjet dyes will be well-known to the person skilled in the art and the present invention is not limited to any particular type of dye. By way of example, dyes suitable for use in the present invention include include azo dyes (e.g. Food Black 2), metal complex dyes, naphthol dyes, anthraquinone dyes, indigo dyes, carbonium dyes, quinone-imine dyes, xanthene dyes, cyanine dyes, quinoline dyes, nitro dyes, nitroso dyes, benzoquinone dyes, naphthoquinone dyes, phthalocyanine dyes (including naphthalocyanine dyes), and metal phthalocyanine dyes (including metal naphthalocyanine dyes, such as those described in U.S. Pat. No. 7,148,345, the contents of which is herein incorporated by reference).

Examples of suitable dyes include: CI Direct Black 4, 9, 11, 17, 19, 22, 32, 80, 151, 154, 168, 171, 194 and 195; CI Direct Blue 1, 2, 6, 8, 22, 34, 70, 71, 76, 78, 86, 142, 199, 200, 201, 202, 203, 207, 218, 236 and 287; CI Direct Red 1, 2, 4, 8, 9, 11, 13, 15, 20, 28, 31, 33, 37, 39, 51, 59, 62, 63, 73, 75, 80, 81, 83, 87, 90, 94, 95, 99, 101, 110, 189, 225 and 227; CI Direct Yellow 1, 2, 4, 8, 11, 12, 26, 27, 28, 33, 34, 41, 44, 48, 86, 87, 88, 132, 135, 142 and 144; CI Food Black 1 and 2; CI Acid Black 1, 2, 7, 16, 24, 26, 28, 31, 48, 52, 63, 107, 112, 118, 119, 121, 172, 194 and 208; CI Acid Blue 1, 7, 9, 15, 22, 23, 27, 29, 40, 43, 55, 59, 62, 78, 80, 81, 90, 102, 104, 111, 185 and 254; CI Acid Yellow 1, 3, 4, 7, 11, 12, 13, 14, 19, 23, 25, 34, 38, 41, 42, 44, 53, 55, 61, 71, 76 and 79; CI Reactive Blue 1, 2, 3, 4, 5, 6, 7, 8, 9, 13, 14, 15, 17, 18, 19, 20, 21, 25, 26, 27, 28, 29, 31, 32, 33, 34, 37, 38, 39, 40, 41, 43, 44 and 46; CI Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 44, 45, 46, 49, 50, 58, 59, 63, 64, and 180; CI Reactive Yellow 1, 2, 3, 4, 6 7, 11, 12, 13, 14, 15, 16, 17, 18, 22, 23, 24, 25, 26, 27, 37 and 42; CI Reactive Black 1, 3, 4, 5, 6, 8, 9, 10, 12, 13, 14 and 18; Pro-Jet® Fast Cyan 2 (Fujifilm Imaging Colorants); Pro-Jet® Fast Magenta 2 (Fujifilm Imaging Colorants); Pro-Jet® Fast Yellow 2 (Fujifilm Imaging Colorants); and Pro-Jet® Fast Black 2 (Fujifilm Imaging Colorants).

Conventional pigments suitable for use in the present invention may be inorganic pigments or organic pigments. Examples of conventional pigments are carbon black, Cadmium Red, Molybdenum Red, Chrome Yellow, Cadmium Yellow, Titan Yellow, chromium oxide, Viridian, Titan Cobalt Green, Ultramarine Blue, Prussian Blue, Cobalt Blue, diketopyrrolo-pyrrole, anthraquinone, benzimidazolone, anthrapyrimidine, azo pigments, phthalocyanine pigments (including naphthlocyanine pigments), uinacridone pigments, isoindolinone pigments, dioxazine pigments, indanthrene pigments, perylene pigments, perinone pigments, thioindigo pigments, quinophthalone pigments, and metal complex pigments.

Examples of suitable pigments include: Cyan COJ450 (Cabot), D71C and D75C (Diamond Dispersions); Magenta COJ465 (Cabot), D71M, D75M, D71PV19 (Diamond Dispersions), Hostajet Magenta E-PT VP2690 and Hostajet Magenta E5B-PT VP3565 (Clariant); Yellow COJ270 and COJ470 (Cabot), or D71Y, D71Y155, D75Y (Diamond Dispersions) and Hostajet Yellow 4G-PT VP2669 (Clariant); Black CW1, CW2, CW3 (Orient) or COJ200, COJ300, COJ400 (Cabot) or SDP1000, SDP2000 (Sensient), or D71K, D75K, D77K, D80K (Diamond Dispersions) and Hostajet Black O-PT (Clariant); Red D71R (Diamond Dispersions); Blue D71B (Diamond Dispersions).

The pigments may be self-dispersing pigments, such as surface-modified pigments. The surface modification may be via either an anionic group, a cationic group or direct modification of the pigment surface. Typical surface-modifying groups are carboxylate and sulfonate groups. However, other surface-modifying groups may also be used, such as anionic phosphate groups or cationic ammonium groups.

Specific examples of suitable aqueous surface-modified pigment dispersions are Sensijet® Black SDP-2000, SDP-1000 and SDP-100 (available from Sensient Colors Inc.) and CAB-O-JET® 200, 300, 250C, 260M and 270Y (available from Cabot Corporation).

Alternatively, the pigments may be conventional pigment dispersions, which include a polymeric dispersant for encapsulating unmodified pigment particles. Examples of suitable pigment dispersions and their preparation are described in, for example, U.S. Pat. No. 9,834,694, the contents of which are incorporated herein by reference.

The average particle size of pigment particles in inkjet inks is typically in the range of 50 to 500 nm.

Pigments and dyes may be used in inkjet inks either individually or as a combination of two or more thereof.

Ink Vehicle

The ink vehicles used in the present invention are typically conventional aqueous ink vehicles comprising at least 40 wt % water, at least 50 wt % water or at least 60 wt % water. Usually, the amount of water present in the inkjet ink is in the range of 40 wt % to 90 wt %, or optionally in the range of 50 wt % to 70 wt %.

Inks according to the present invention may further comprise co-solvents (including humectants, penetrants, wetting agents etc.), surfactants, biocides, sequestering agents, pH adjusters, viscosity modifiers, etc.

Co-solvents are typically water-soluble organic solvents. Suitable water-soluble organic solvents include $C_{1-4}$ alkyl alcohols, such as ethanol, methanol, butanol, propanol, and 2-propanol; alkylene glycols, such as ethylene glycol, diethylene glycol, triethylene glycol and tetraethylene glycol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether; formamide, acetamide, dimethyl sulfoxide, sorbitol, sorbitan, glycerol monoacetate, glycerol diacetate, glycerol triacetate, and sulfolane; or combinations thereof.

Other useful water-soluble organic solvents, which may be used as co-solvents, include polar solvents, such as 2-pyrrolidone, N-methylpyrrolidone, ε-caprolactam, dimethyl sulfoxide, morpholine, N-ethylmorpholine, 1,3-dimethyl-2-imidazolidinone and combinations thereof.

The inkjet ink may contain another high-boiling water-soluble organic solvent as a co-solvent, which can serve as a wetting agent or humectant for imparting water retentivity and wetting properties to the ink composition. Examples of high-boiling water-soluble organic solvents are 2-butene-1, 4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, diethylene glycol monobutyl ether, diethylene glycol monoethyl ether, diethylene glycol monomethyl ether, tripropylene glycol, polyethylene glycols having molecular weights of 2000 or lower, 1,3-propylene glycol, isopropylene glycol, isobutylene glycol, 1,4-butanediol, 1,3-butanediol, 1,5-pentanediol, 1,6-hexanediol, glycerol, trimethylolpropane, erythritol, pentaerythritol and combinations thereof.

Other suitable wetting agents or humectants include saccharides (including monosaccharides, oligosaccharides and polysaccharides) and derivatives thereof (e.g. maltitol, sorbitol, xylitol, hyaluronic salts, aldonic acids, uronic acids etc.).

The inkjet ink may also contain a penetrant, as one of the co-solvents, for accelerating penetration of the aqueous ink into the recording medium. Suitable penetrants include polyhydric alcohol alkyl ethers (glycol ethers) and/or 1,2-alkyldiols. Examples of suitable polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether. Examples of suitable 1,2-alkyldiols are 1,2-pentanediol and 1,2-hexanediol. The penetrant may also be selected from straight-chain hydrocarbon diols, such as 1,3-propanediol, 1,4-butanediol, 1,5-pentanediol, 1,6-hexanediol, 1,7-heptanediol, and 1,8-octanediol. Glycerol may also be used as a penetrant.

As described in WO2020/038726, diethylene glycol monoalkyl ethers, such as diethylene glycol mono-n-butyl ether (n-butyl diglycol), are typically included in the ink vehicle from the viewpoint of improving dry times. An amount of glycol monoalkyl ether present in the ink vehicle is typically in the range of 1 to 10 wt. %.

Typically, the total amount of co-solvent present in the ink is in the range of about 5 wt % to 60 wt %, or optionally 10 wt % to 50 wt %.

Surfactant

The surfactant package may contain surfactants in addition to those described above. For example, anionic surfactants, zwitterionic surfactants and nonionic surfactants may be included in the surfactant package to assist in tuning ink properties. Useful anionic surfactants include sulfonic acid types, such as alkanesulfonic acid salts, α-olefinsulfonic acid salts, alkylbenzenesulfonic acid salts, alkylnaphthalenesulfonic acids, acylmethyltaurines, and dialkylsulfosuccinic acids; alkylsulfuric ester salts, sulfated oils, sulfated olefins, polyoxyethylene alkyl ether sulfuric ester salts; carboxylic acid types, e.g., fatty acid salts and alkylsarcosine salts; and phosphoric acid ester types, such as alkylphosphoric ester salts, polyoxyethylene alkyl ether phosphoric ester salts, and glycerophosphoric ester salts. Specific examples of the anionic surfactants are di($C_{6-30}$ alkyl) sulfosuccinate sodium salt, sodium dodecylbenzenesulfonate, sodium laurate, and a polyoxyethylene alkyl ether sulfate ammonium salt.

Examples of zwitterionic surfactants include N,N-dimethyl-N-octyl amine oxide, N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide and N,N-dimethyl-N—(Z-9-octadecenyl)-N-amine oxide.

Examples of nonionic surfactants include ethylene oxide adduct types, such as polyoxyethylene alkyl ethers, polyoxyethylene alkylphenyl ethers, polyoxyethylene alkyl esters, and polyoxyethylene alkylamides; polyol ester types, such as glycerol alkyl esters, sorbitan alkyl esters, and sugar alkyl esters; polyether types, such as polyhydric alcohol alkyl ethers; and alkanolamide types, such as alkanolamine fatty acid amides. Specific examples of nonionic surface active agents are ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, and polyoxyalkylene alkyl ethers (e.g. polyoxyethylene alkyl ethers); and esters, such as polyoxyethylene oleate, polyoxyethylene oleate ester, polyoxyethylene distearate, sorbitan laurate, sorbitan monostearate, sorbitan mono-oleate, sorbitan sesquioleate, polyoxyethylene mono-oleate, and polyoxyethylene stearate.

Additional acetylene glycol surfactants may also be included in the surfactant package. Specific examples of such nonionic surfactants are Surfynols® (commercially available from Air Products and Chemicals, Inc).

Rake-type alkoxylated silicone surfactants may also be used in small quantities (e.g. 0.1 wt. % or less). Specific examples of rake-type ethoxylated silicone surfactants are BYK-345, BYK-346 and BYK-349 (manufactured by BYK Japan K.K.), as well as Silface™ SAG-002, SAG-005, SAG-008, SAG-KB and SAG-503A (manufactured by Nissin Chemical Industry Co. Ltd.).

The total amount of surfactant(s) present in the ink is typically in an amount ranging from 0.05 wt. % to 2 wt % or 0.1 to 1.5 wt. %.

Other Additives

The aqueous inkjet ink may also include a pH adjuster or buffer, such as sodium hydroxide, potassium hydroxide, lithium hydroxide, sodium carbonate, sodium hydrogencarbonate, potassium carbonate, potassium hydrogencarbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate, and potassium hydrogentartrate; ammonia; and amines, such as methylamine, ethylamine, diethylamine, trimethylamine, triethylamine, tris(hydroxymethyl) aminomethane hydrochloride, triethanolamine, diethanolamine, diethylethanolamine, triisopropanolamine, butyldiethanolamine, morpholine, propanolamine, 4-morpholineethanesulfonic acid and 4-morpholinepropanesulfonic acid ("MOPS"). The amount of pH adjuster, when present, is typically in the range of from 0.01 to 2 wt. % or 0.05 to 1 wt. %.

The aqueous inkjet ink may also include a biocide, such as benzoic acid, dichlorophene, hexachlorophene, sorbic acid, hydroxybenzoic esters, sodium dehydroacetate, 1,2-benthiazolin-3-one ("Proxel® GXL", available from Arch Chemicals, Inc.), 3,4-isothiazolin-3-one or 4,4-dimethyloxazolidine. The amount of biocide, when present, is typically in the range of from 0.01 to 2 wt. % or 0.05 to 1 wt. %.

The aqueous inkjet ink may also contain a sequestering agent, such as ethylenediaminetetraacetic acid (EDTA).

The aqueous inkjet ink may contain certain metals salts, particularly trivalent metal salts, such as an aluminium salt and/or gallium salt for the purpose of minimizing dissolution of silica in nozzle chambers over the lifetime of the printhead. Suitable trivalent metals salts are described in, for example, WO2012/151630, the contents of which is incorporated herein by reference.

The aqueous inkjet ink may additionally contain small quantities (e.g. 2 to 90 ppm) of ammonium salts (e g ammonium nitrate, ammonium formate etc.) for the purpose of minimizing heater delamination and extending the lifetime of the printhead. Ink formulations containing such ammonium salts are described in WO2020/038725, the contents of which are incorporated herein by reference.

Inkjet Printheads

The inks according to the present invention are primarily for use in connection with thermal inkjet printheads, although they may of course be used in other types of printhead. An exemplary type of inkjet printhead is described in, for example, U.S. Pat. Nos. 9,950,527, 9,283, 756 and 9,994,017, the contents of each of which are incorporated herein by reference.

Experimental Section

Ghosting Performance Test

Ghosting performances of inks were tested using a standard protocol developed by the Applicant. A freshly manufactured printhead of the type described in U.S. Pat. No. 9,950,527 (the contents of which are incorporated herein by reference) having thermal inkjet nozzle devices was used initially to print solid vertical bars arranged in triplets at 100% density. After 300 feet of printing triplet bars, all nozzles were used to print a plain grayscale background image at 50% density. After printing 40 pages of the background image, L* values were determined in the background image for triplet bar regions (that is, those regions corresponding to the previously printed triplet bars) as well as background regions outside the triplet bars. Characteristically, the triplet bar regions have lower L* values than background regions after 40 pages. This difference in L* values is recorded as a ΔL* value indicative of ghosting performance—a larger ΔL* value (e.g. 3 or above) indicates relatively poor ghosting performance (in other words, the 'ghost' of the triplet bars is visible in the background image by way of a lower image intensity); a smaller ΔL* value indicates good ghosting performance Ink Formulations Aqueous pigment-based inks were formulated as described in Table 1 and filtered (0.2 microns) prior to use. Ink components are shown as wt. % and all inks contained 2 ppm aluminum ions as aluminum nitrate. All inks had a surface tension in the range of 27 to 31 mN/m.

TABLE 1

Ink formulations for ghosting performance tests

| Component | Ink 1 | Ink 2 | Ink 3 | Ink 4 | Ink 5 | Ink 6 |
|---|---|---|---|---|---|---|
| n-Butyl diglycol | 4.0 | 4.0 | 4.0 | 4.0 | 4.0 | 4.0 |
| Triethylene glycol | 10.0 | 10.0 | 10.0 | 8 | 8 | 8 |
| Glycerol | 4.0 | 4.0 | 4.0 | 3.0 | 3.0 | 3.0 |
| Black Pigment (styrene-acrylic polymer dispersion) | 5.0 | 5.0 | 5.0 | 5.0 | 5.0 | 5.0 |
| Dynol™ 360[a] | 0.5 | | | | | |
| BYK-3410[b] | 0.05 | 0.05 | 0.05 | | | 0.1 |
| Dow Corning 8526[c] | 0.3 | | 0.3 | 0.3 | 0.3 | 0.3 |
| Surfynol® 440[e] | | 1.2 | 1.2 | 0.825 | 0.825 | 0.825 |
| Emulgen™ 120[d] | | | | 0.165 | 0.165 | 0.165 |
| Glycine | | | | | 0.1 | 0.1 |
| Water | balance | balance | balance | balance | balance | balance |

[a]Dynol™ 360 is a non-ethoxylated nonionic thioether surfactant having an HLB value of 3-4
[b]BYK-3410 is a sulfosuccinate anionic surfactant
[c]Dow Corning Additive 8526 is an ABA-type bis-alkoxylated silicone compound of formula (IV)
[d]Emulgen™ 120 is polyoxyethylene lauryl ether, available from Kao Corporation.
[e]Surfynol® 440 is a nonionic acetylenic surfactant having an HLB value of 8, available from Nissin Chemical Industry Co., Ltd.

Ghosting performances of Inks 1-6 using the test method described above are shown in Table 2 below:

TABLE 2

Ghosting Performance Test Results

| | Ink 1 | Ink 2 | Ink 3 | Ink 4 | Ink 5 | Ink 6 |
|---|---|---|---|---|---|---|
| ΔL* | 4.8 | 3.2 | 1.2 | 2.5 | 1.5 | 0.8 |

The results in Table 2 demonstrate that Inks 3 to 6 containing a combination of Surfynol® 440 and Dow Corning Additive 8526 significantly outperformed Inks 1 and 2 in terms of ghosting. While Ink 3 had excellent ghosting performance, the relatively high amount of Surfynol® 440® is disadvantageous in terms of ink stability. In Ink 4, an additional nonionic surfactant (polyoxyethylene lauryl ether) helps to improve ink stability whilst having improved ghosting performance compared to Inks 1 and 2. In Inks 5 and 6, ghosting performance was improved even further with the addition of glycine (Ink 5) or glycine together with an anionic surfactant (Ink 6). While Ink 6 exhibited the best ghosting performance of the inks tested, from standpoint of an overall balance of ink properties, Ink 5 was generally preferred due to its observed lower foaming characteristics.

Qualitatively, inks formulated with higher HLB surfactants (e.g. Surfynol® 465) were less stable due to increased phase separation and had poor storage performance. To the extent such inks could be formulated and tested, ghosting performance was significantly worse than Inks 3 to 6, although such inks were not considered viable due to their poor stability.

It will, of course, be appreciated that the present invention has been described by way of example only and that modifications of detail may be made within the scope of the invention, which is defined in the accompanying claims.

The invention claimed is:

1. An inkjet ink comprising:
   an ink vehicle;
   a polymer;
   a surfactant package comprising an ethoxylated acetylenic nonionic surfactant having an HLB value in the range of 5 to 10;
   glycine in an amount from 0.05 to 0.5 wt. %; and
   an ABA-type bis-alkoxylated silicone compound of formula (I):

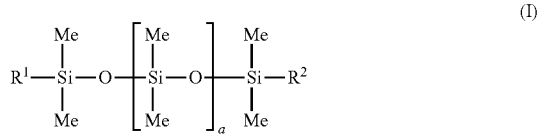

wherein:
   a is 1, 2, 3, 4 or 5;
   $R^1$ and $R^2$ are each independently a moiety of formula (II):

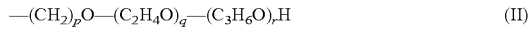

p is 1, 2, 3, 4 or 5;
   q is 0 to 200;
   r is 0 to 200;
   q+r is greater than 1;
   a surface tension of the ink is in the range of 26 to 31 mN/m; and
   a total amount of the ethoxylated acetylenic nonionic surfactant and the ABA-type bis-alkoxylated silicone compound of formula (I) is at least 1 wt. %.

2. The inkjet ink of claim 1, wherein the polymer comprises a styrene-acrylic polymer.

3. The inkjet ink of claim 1, wherein the ethoxylated acetylenic nonionic surfactant has an HLB value in the range of 7 to 9.

4. The inkjet ink of claim 1, wherein the surfactant package further comprises a poly(oxyethylene) alkyl ether surfactant.

5. The inkjet ink of claim 1, wherein the surfactant package comprises an anionic surfactant.

6. The inkjet ink of claim 1 wherein the ink vehicle comprises water and one or more co-solvents.

7. The inkjet of claim 6, wherein the ink vehicle comprises one or more co-solvents selected from the group consisting of: glycol ethers, 1,2-alkyldiols, triethylene glycol and glycerol.

8. The inkjet ink of claim 1 further comprising a pigment.

9. A method of minimizing kogation of a resistive heater element in an inkjet nozzle device, the method comprising:
   supplying the inkjet ink according to claim 1 to the inkjet nozzle device; and
   actuating the heater element,
   wherein:
   the heater element has a metal oxide surface in contact with the ink; and
   the surfactant package and the compound of formula (I) together minimize kogation on the metal oxide surface.

10. An inkjet printer comprising:
    a printhead having a plurality of inkjet nozzle devices; and
    an ink reservoir in fluid communication with the printhead, said ink reservoir containing an ink according to claim 1.

11. The inkjet printer of claim 10, wherein each inkjet nozzle device comprises a resistive heater element having a metal oxide surface.

* * * * *